US008879979B2

(12) United States Patent
Chari et al.

(10) Patent No.: US 8,879,979 B2
(45) Date of Patent: *Nov. 4, 2014

(54) METHOD AND APPARATUS FOR SEAMLESSLY SWITCHING RECEPTION BETWEEN MULTIMEDIA STREAMS IN A WIRELESS COMMUNICATION SYSTEM

(75) Inventors: Murali Ramaswamy Chari, San Diego, CA (US); Gordon Kent Walker, Poway, CA (US); Rajiv Vijayan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 13/210,230

(22) Filed: Aug. 15, 2011

(65) Prior Publication Data

US 2011/0302605 A1    Dec. 8, 2011

Related U.S. Application Data

(63) Continuation of application No. 11/752,291, filed on May 22, 2007, now Pat. No. 8,005,420, which is a continuation of application No. 10/968,613, filed on Oct. 18, 2004, now Pat. No. 7,366,462.

(60) Provisional application No. 60/514,401, filed on Oct. 24, 2003.

(51) Int. Cl.
*H04H 40/00* (2008.01)
(Continued)

(52) U.S. Cl.
CPC .............. *H04N 5/4401* (2013.01); *H04N 5/50* (2013.01); *H04N 21/4384* (2013.01); *H04N 21/41407* (2013.01); *H04N 21/4345* (2013.01); *H04N 21/44222* (2013.01)
USPC .......................................... 455/3.06; 370/509

(58) Field of Classification Search
USPC .............. 455/3.06, 181.1, 132; 704/500, 218, 704/217, 206
See application file for complete search history.

(56) References Cited

U.S. PATENT DOCUMENTS 5,586,128 A    12/1996   Chen
5,933,192 A    8/1999    Crosby et al.
(Continued)

FOREIGN PATENT DOCUMENTS

CN    1310919        8/2001
EP    0441332 A2     8/1991
(Continued)

OTHER PUBLICATIONS

European Search Report—EP10155803—International Search Authority—European Patent Office—Apr. 21, 2010.
(Continued)

*Primary Examiner* — Tu X Nguyen
(74) *Attorney, Agent, or Firm* — Arent Fox LLP

(57) ABSTRACT

Techniques to seamlessly switch reception between multimedia programs are described. For "continued decoding", a wireless device continues to receive, decode, decompress, and (optionally) display a current program until overhead information needed to decode the new program is received. For "early decoding", the wireless device receives a user input and identifies a program with potential for user selection. The wireless device initiates decoding of the identified program, prior to its selection, so that the program can be decompressed and displayed earlier if it is subsequently selected. For time-compensated transmission, a base station transmits video and audio for a program in a manner to account for the difference between audio processing delay and video processing delay at the wireless device. This allows the wireless device to present the audio earlier during a program change, since its processing delay is shorter, and thus provide a faster response to the program change.

80 Claims, 10 Drawing Sheets

(51) Int. Cl.
*H04N 5/44* (2011.01)
*H04N 5/50* (2006.01)
*H04N 21/438* (2011.01)
*H04N 21/414* (2011.01)
*H04N 21/434* (2011.01)
*H04N 21/442* (2011.01)

(56) References Cited

U.S. PATENT DOCUMENTS

| | | | |
|---|---|---|---|
| 5,953,049 A | 9/1999 | Horn et al. | |
| 5,999,899 A * | 12/1999 | Robinson | 704/222 |
| 6,256,348 B1 | 7/2001 | Laczko et al. | |
| 6,334,217 B1 | 12/2001 | Kim | |
| 6,378,101 B1 | 4/2002 | Sinha et al. | |
| 6,496,980 B1 | 12/2002 | Tillman et al. | |
| 6,510,553 B1 | 1/2003 | Hazra | |
| 6,519,011 B1 | 2/2003 | Shendar | |
| 6,556,131 B1 | 4/2003 | Besharat et al. | |
| 6,714,264 B1 | 3/2004 | Kempisty | |
| 6,741,795 B1 | 5/2004 | Takehiko et al. | |
| 6,804,824 B1 | 10/2004 | Potrebic et al. | |
| 6,927,806 B2 | 8/2005 | Chan | |
| 7,196,722 B2 | 3/2007 | White et al. | |
| 7,353,284 B2 * | 4/2008 | Agnoli et al. | 709/233 |
| 7,366,462 B2 | 4/2008 | Murali et al. | |
| 7,463,737 B2 | 12/2008 | Gillon et al. | |
| 8,005,420 B2 | 8/2011 | Murali et al. | |
| 8,208,499 B2 * | 6/2012 | Sun et al. | 370/514 |
| 2001/0008535 A1 | 7/2001 | Lanigan | |
| 2002/0082845 A1 * | 6/2002 | Sato | 704/500 |
| 2002/0087973 A1 | 7/2002 | Hamilton et al. | |
| 2002/0174440 A1 | 11/2002 | Usuba et al. | |
| 2003/0026342 A1 | 2/2003 | Horiike et al. | |
| 2003/0142744 A1 | 7/2003 | Wu et al. | |
| 2003/0196211 A1 | 10/2003 | Chan | |
| 2004/0073930 A1 * | 4/2004 | Demas et al. | 725/71 |
| 2004/0260823 A1 * | 12/2004 | Tiwari et al. | 709/230 |
| 2005/0003781 A1 | 1/2005 | Kunz et al. | |
| 2005/0054289 A1 | 3/2005 | Salazar et al. | |
| 2005/0276282 A1 * | 12/2005 | Wells et al. | 370/503 |
| 2006/0133495 A1 | 6/2006 | Ye et al. | |

FOREIGN PATENT DOCUMENTS

| | | |
|---|---|---|
| EP | 1107601 A2 | 6/2001 |
| EP | 1168692 A1 | 1/2002 |
| EP | 1178640 A1 | 2/2002 |
| EP | 1185087 A2 | 3/2002 |
| JP | 2035886 A | 2/1990 |
| JP | 2082887 A | 3/1990 |
| JP | H0759030 A | 3/1995 |
| JP | 09083883 | 3/1997 |
| JP | 9093553 A | 4/1997 |
| JP | 10294930 A | 11/1998 |
| JP | 10336602 | 12/1998 |
| JP | 11027102 A | 1/1999 |
| JP | 11168706 A | 6/1999 |
| JP | 2000134572 | 5/2000 |
| JP | 20010094892 | 4/2001 |
| JP | 20010103414 | 4/2001 |
| JP | 20010189894 | 7/2001 |
| JP | 2002111620 A | 4/2002 |
| JP | 2002165148 A | 6/2002 |
| JP | 2002300579 A | 10/2002 |
| JP | 2004280994 A | 10/2004 |
| JP | 2008526119 A | 7/2008 |
| JP | 2009532990 | 9/2009 |
| KR | 1999002689 | 1/1999 |
| KR | 0309099 | 9/2001 |
| RU | 2106758 | 3/1998 |
| RU | 2142210 | 11/1999 |
| WO | WO0016544 A2 | 3/2000 |
| WO | WO0062552 | 10/2000 |
| WO | 0106772 A1 | 1/2001 |
| WO | 0217615 | 2/2002 |
| WO | WO03063418 | 7/2003 |
| WO | WO03063507 A1 | 7/2003 |
| WO | WO03073754 A1 | 9/2003 |

OTHER PUBLICATIONS

European Search Report—EP10155805—International Search Authority—European Patent Office—Apr. 12, 2010.
European Search Report—EP10155807—International Search Authority—European Patent Office—Apr. 13, 2010.
European Search Report—EP10155810—International Search Authority—European Patent Office—May 11, 2010.
International Search Report PCT/US04/034884, International Search Authority-US, Feb. 21, 2007.
Supplementary European Search Report—EP04795971—Search Authority—The Hague—Jul. 14, 2008.
Taiwan Search Report—TW093132165—TIPO—Jun. 14, 2011.
Written Opinion—PCT/US2004/034884, ISA/US—Alexandria, Virginia—Feb. 21, 2007.
Ramaswamy, et al., "Method for Seamlessly Switching Reception Between Multimedia Streams in a Wireless Multicast Network," U.S. U.S. Appl. No. 60/514,401, filed Oct. 24, 2003.
Ohmsha Ltd., "Selection of Integrated Multimedia MPEG", Institute of Image Information and Television Engineers, 1st ed., pp. 119-121, Apr. 20, 1996.
Interface: "Basic Technology of Digital Broadcasting", Japan, CQ Publishing Company, Jan. 1, 2002, pp. 113-114.
Taiwan Search Report—TW100148186—TIPO—Dec. 28, 2013.

* cited by examiner

| 1012 | 1014 | 1016 | 1018 | 1020 |
|---|---|---|---|---|
| Program Channel | Program Name | MLCs | MLC Parameters | MLC Location |
| ⋮ | ⋮ | ⋮ | ⋮ | ⋮ |
| 11 | NHL Hocky | 34, 35 | - | - |
| 12 | Baseball | 40, 41, 42 | - | - |
| 13 | Behind the Glory | 43, 44 | - | - |
| 14 | James Bond | 48, 50, 51 | - | - |
| 15 | Devil's Advocate | 52, 53, 54 | - | - |
| 16 | Enemy at the Gate | 58, 59, 60, 61 | - | - |
| ⋮ | ⋮ | ⋮ | ⋮ | ⋮ |

METHOD AND APPARATUS FOR SEAMLESSLY SWITCHING RECEPTION BETWEEN MULTIMEDIA STREAMS IN A WIRELESS COMMUNICATION SYSTEM

CROSS-REFERENCE TO RELATED APPLICATIONS

This application is a continuation of U.S. patent application Ser. No. 11/752,291, filed May 22, 2007, a continuation of U.S. patent application Ser. No. 10/968,613, filed Oct. 18, 2004, now U.S. Pat. No. 7,366,462, which claims the benefit of provisional U.S. Application Ser. No. 60/514,401, entitled "A Method for Seamlessly Switching Reception Between Multimedia Streams in a Wireless Multicast Network," filed Oct. 24, 2003, which are hereby incorporated by reference in their entirety.

BACKGROUND

I. Field

The present invention relates generally to communication, and more specifically to techniques for switching reception between multimedia streams.

II. Background

A wireless communication system may simultaneously transmit multiple data streams for broadcast, multicast, and/or unicast services. A data stream is a stream of data that may be independently received by a wireless device. A broadcast transmission is sent to all wireless devices within a coverage area, a multicast transmission is sent to a group of wireless devices, and a unicast transmission is sent to a specific wireless device. For example, a base station may transmit a number of data streams for multimedia (e.g., television) programs via a terrestrial radio link for reception by wireless devices within the coverage area of the base station.

A wireless device may receive only one of the multimedia programs transmitted by the base station at any given moment. To receive this program, the wireless device identifies all data streams transmitted by the base station for the program, determines pertinent parameters for each data stream of interest (e.g., how and where each data stream is transmitted), decodes each data stream in accordance with these parameters, and further processes each decoded data stream to generate an output suitable for presentation to a user. The wireless device continuously decodes the data streams for the selected program and provides decoded data in a streaming manner as long as the program is selected for reception.

If the user selects another multimedia program for reception, then the wireless device typically needs to perform a set of tasks in order to acquire, decode, and display the new program. These tasks may include terminating the decoding and processing of the current program, identifying all data streams transmitted by the base station for the new program, determining pertinent parameters for each data stream for the new program, and decoding each new data stream in accordance with its parameters. The wireless device may "freeze" the display with the last decoded frame for the old program or "blank" the display with a blue or black background during the time that the device is performing the tasks for the new program. The amount of time needed to acquire and decode the new program may be relatively long (e.g., over 1 second) for some wireless systems. In this case, freezing or blanking the display for the entire time duration may prove "annoying" to the user.

There is therefore a need in the art for better techniques to switch reception between multimedia programs.

SUMMARY

Techniques to seamlessly switch reception between multimedia programs/streams are described herein. These techniques can provide better user experience for program switches and faster acquisition speed in some instances. These techniques include "continued decoding" of a currently selected program, "early decoding" of an anticipated program, and time-compensated video and audio transmission.

For continued decoding, a wireless device continues to receive, decode, decompress, and (optionally) display the current program, even after a new program has been selected, until overhead information needed to receive and decode the new program is obtained. In the context of stream processing, "decoding" refers to physical layer receiver processing or channel decoding, and "decompression" refers to higher layer receiver processing or source decoding (e.g., video and audio decompression). After obtaining the overhead information, the wireless device decodes the new program but continues to decompress the current program with decoded data obtained previously for the current program. The wireless device then decompresses the new program after completing the decoding of this program. If the current and new programs are transmitted with layered coding (which is not a requirement), then the transition between the two programs may be made more smoothly as described below.

For early decoding, the wireless device receives a user input and identifies a program with potential for user selection. The user input may be for evocation of a program guide, user navigation via the program guide, keystroke on a remote control unit, and so on. The identified program may be the one highlighted by the user input or a program anticipated to be selected based on the user input. The wireless device initiates decoding of the identified program, prior to its selection, so that the program can be decompressed and displayed in a shorter amount of time if it is subsequently selected. The wireless device may also perform certain tasks (e.g., continually receive overhead information) in anticipation of user selection for a new program, so that this program may be decoded, decompressed, and displayed earlier.

For time-compensated transmission, a base station transmits video and audio for a program in a manner to account for the difference between audio processing delay and video processing delay at the wireless device. If the video processing delay is longer than the audio processing delay by AD, then the base station may transmit the video earlier by AD. The wireless device is then able to receive, decode, decompress, and present the audio and video with little or no buffering while achieving proper time-alignment of the video and audio. This allows the wireless device to present the audio earlier during a program change, since its processing delay is shorter, and thus provide a faster response to the program change.

The techniques described herein may be applied individually or in combination. Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The techniques described herein for seamlessly switching reception between multimedia streams may be used for wireless and wireline communication systems, for time division multiplexed (TDM), frequency division multiplexed (FDM), and code division multiplexed (CDM) systems, and for single-carrier and multi-carrier systems. Multiple carriers may be provided by orthogonal frequency division multiplexing (OFDM), some other multi-carrier modulation techniques, or some other construct. The techniques described herein may also be used for broadcast, multicast, and unicast services. For clarity, these techniques are described below for an exemplary wireless communication system employing a specific concatenated coding scheme, a specific frame structure, and a specific transmission scheme.

Figure 1:
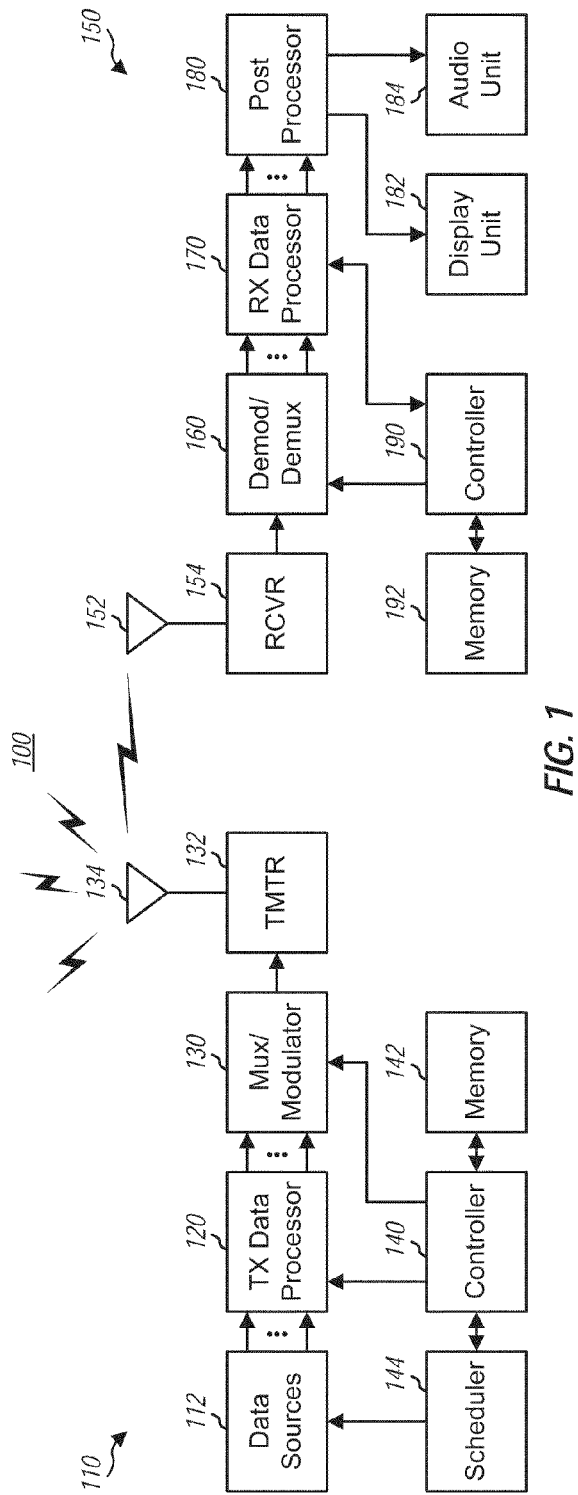
FIG. 1 shows a block diagram of a base station and a wireless device.

FIG. 1 shows a block diagram of a base station 110 and a wireless device 150 in a wireless communication system 100. Base station 110 is generally a fixed station and may also be called a base transceiver system (BTS), an access point, a transmitter, or some other terminology. Wireless device 150 may be fixed or mobile and may also be called a user terminal, a mobile station, a receiver, or some other terminology. Wireless device 150 may also be a portable unit such as a cellular phone, a handheld device, a wireless module, a personal digital assistant (PDA), and so on.

At base station 110, a TX data processor 120 receives multiple (T) data streams (or "traffic" data) from data sources 112 and processes (e.g., compresses, encodes, interleaves, and symbol maps) each data stream to generate data symbols. As used herein, a "data symbol" is a modulation symbol for traffic data, a "pilot symbol" is a modulation symbol for pilot (which is data that is known a priori by both the base station and wireless devices), and a modulation symbol is a complex value for a point in a signal constellation for a modulation scheme (e.g., M-PSK, M-QAM, and so on). A multiplexer (Mux)/modulator 130 receives and multiplexes the data symbols for all data streams with pilot symbols and generates a composite symbol stream. Modulator 130 performs modulation on the composite symbol stream and generates a stream of data samples. A transmitter unit (TMTR) 132 converts the data sample stream into analog signals and further conditions (e.g., amplifies, filters, and frequency upconverts) the analog signals to generate a modulated signal. Base station 110 then transmits the modulated signal from an antenna 134 to wireless devices in the system.

At wireless device 150, the transmitted signal from base station 110 is received by an antenna 152 and provided to a receiver unit (RCVR) 154. Receiver unit 154 conditions (e.g., filters, amplifies, frequency downconverts, and digitizes) the received signal and provides a stream of input samples. A demodulator/demultiplexer (Demod/Demux) 160 performs demodulation on the input samples to obtain received symbols for one or more data streams of interest (e.g., all data streams for a selected multimedia program). Demodulator 160 further performs detection (e.g., equalization or matched filtering) on the received symbols to obtain detected data symbols, which are estimates of the data symbols sent by base station 110. An RX data processor 170 processes (e.g., symbol demaps, deinterleaves, decodes, and decompresses) the detected data symbols for each selected data stream and provides output data for that stream. The processing by demodulator 160 and RX data processor 170 is complementary to the processing by modulator 130 and TX data processor 120, respectively, at base station 110. A post processor 180 processes (e.g., converts to analog, filters, and amplifies) the output data for the selected data streams and generates output signals suitable for presentation on an electronics display unit 182 (e.g., an LCD screen), an audio unit 184 (e.g., a loudspeaker), and/or other output devices.

Controllers 140 and 190 direct operation at base station 110 and wireless device 150, respectively. Memory units 142 and 192 provide storage for program codes and data used by controllers 140 and 190, respectively. Controller 140 or a scheduler 144 may allocate resources for the data streams transmitted by base station 110.

Base station 110 may transmit the T data streams for multimedia (e.g., television) programs and for multimedia content such as video, audio, teletext, data, video/audio clips, and so on. A single multimedia program may be transmitted in multiple data streams, e.g., three separate data streams for video, audio, and data. This allows a wireless device to independently receive the video, audio, and data portions of the multimedia program. A single multimedia program may also have multiple audio data streams, e.g., for different languages. For simplicity, the following description assumes that each data stream is sent on a separate data channel, which is also called a multiplexed logical channel (MLC). In this case, there is a one-to-one relationship between data streams and MLCs. In general, each MLC/data channel may carry any number of data streams. Base station 110 may transmit the data streams using various transmission schemes, one of which is described below.

Figure 2:
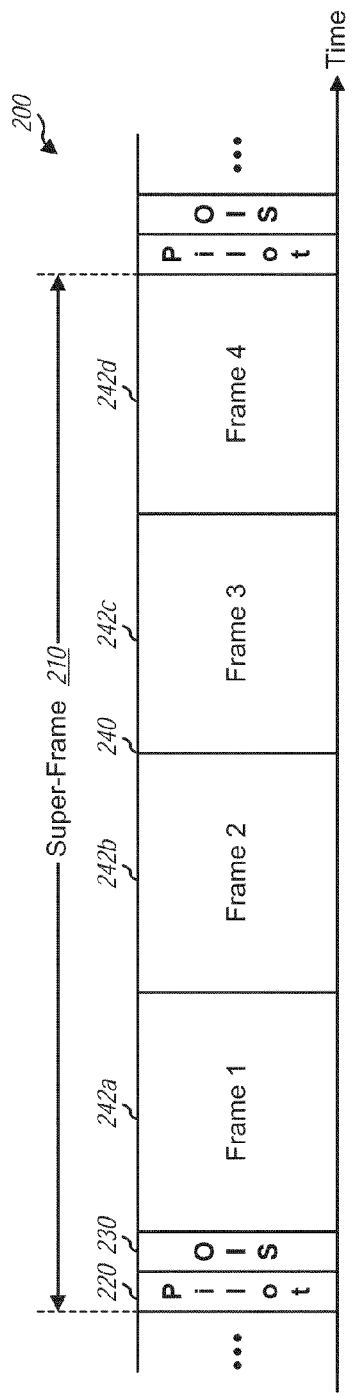
FIG. 2 shows an exemplary super-frame structure.

FIG. 2 shows an exemplary super-frame structure 200 that may be used for system 100. Traffic data may be transmitted in super-frames, with each super-frame 210 having a predetermined time duration (e.g., approximately 1 second). A super-frame may also be referred to as a frame, a time slot, or some other terminology. For the embodiment shown in FIG. 2, each super-frame 210 includes a field 220 for a pilot, a field 230 for one or more overhead/control information symbols (OIS), and a field 240 for traffic data. The wireless devices may use the pilot for synchronization (e.g., frame detection, frequency error estimation, and timing acquisition) and possibly for channel estimation. The overhead information may indicate various parameters for the T data streams being transmitted (e.g., the time-frequency location of each data stream within the super-frame). The T data streams are sent in field 240. For the embodiment shown in FIG. 2, field 240 is further divided into four equal-size frames 242a through 242d to facilitate data transmission. In general, a super-frame may be of any time duration and may include any number of fields and frames. Pilot and overhead information may also be sent in other manners different from that shown in FIG. 2.

Figure 3:
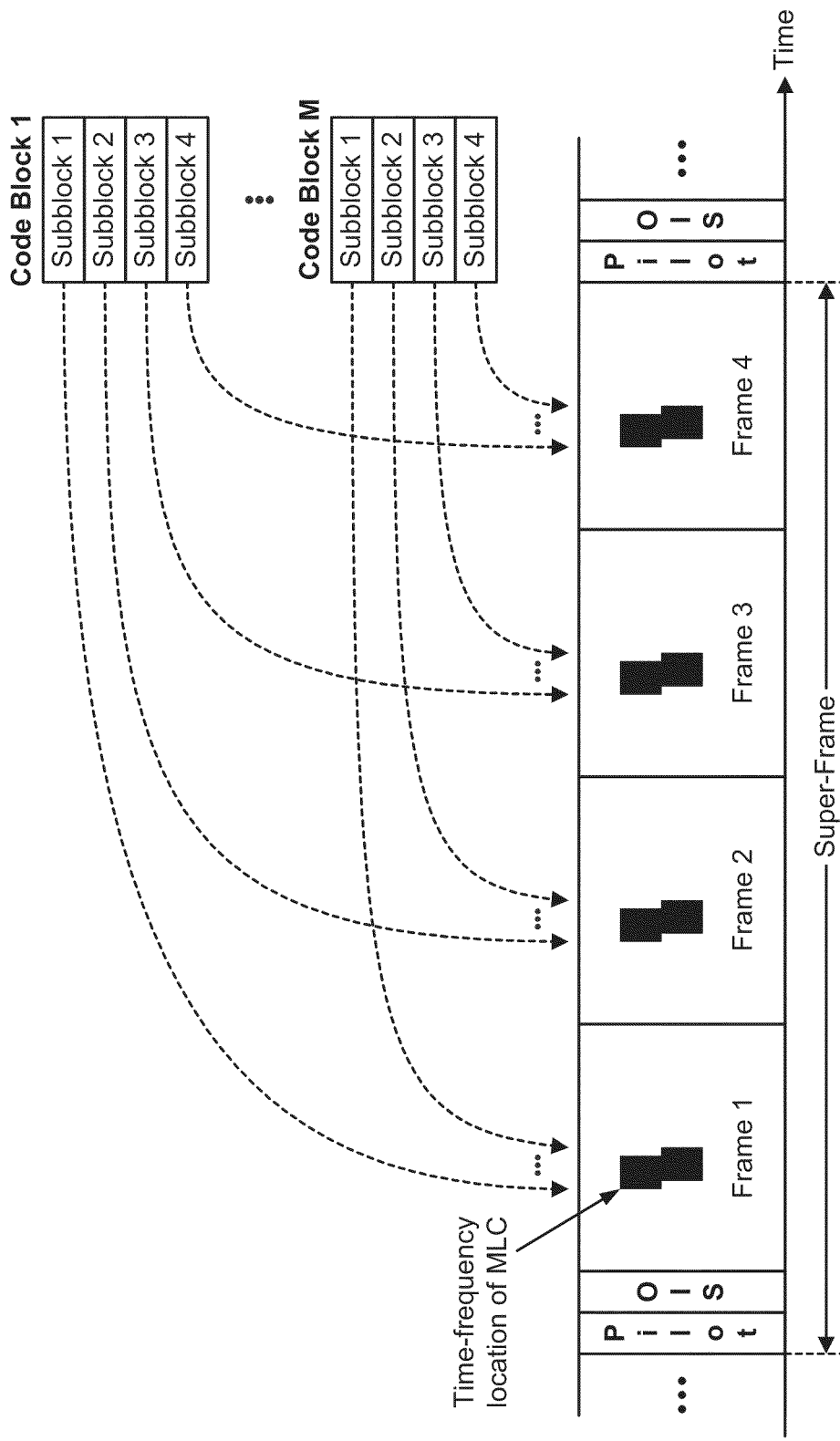
FIG. 3 illustrates transmission of a data stream on a data channel.

FIG. 3 illustrates an exemplary transmission of a data stream on an MLC. The data stream is processed in data blocks. M data blocks may be transmitted on the MLC in each super-frame, where M 0 and may change from super-frame to super-frame. Each data block contains a particular number of information bits and is encoded separately with an outer code to generate a code block. Each code block is then partitioned into four subblocks, and each subblock is encoded with an inner code and modulated (i.e., mapped to modulation symbols) based on a "mode" selected for the MLC. The mode may indicate an inner code rate and a modulation scheme used for the MLC. The four subblocks of modulation symbols for each code block are transmitted in the four frames of one super-frame, one subblock per frame, to achieve time diversity and robust reception performance. For each frame, M subblocks for the M code blocks are transmitted in a portion of the frame that has been allocated to the MLC.

Each MLC may be transmitted in a continuous or non-continuous manner, depending on the nature of the data stream being carried by that MLC and possibly other factors. For each super-frame, an "active" MLC is an MLC that is being transmitted in that super-frame. Each active MLC may carry one or multiple data blocks in the super-frame. To simplify the allocation and assignment of resources, each active MLC is granted the same resource assignment (e.g., the same time-frequency location) for the four frames, as shown in FIG. 3.

Referring back to FIG. 2, the OIS for each super-frame may carry "composite" overhead information for all active MLCs sent in that super-frame. The composite overhead information conveys pertinent parameters for each active MLC (e.g., the time-frequency location of the MLC in the super-frame). In addition, each MLC may carry "embedded" overhead information pertaining to that MLC's transmission in the next super-frame. The embedded overhead information allows the wireless device to recover the MLC's transmission in the next super-frame without having to check the OIS sent in that super-frame. The wireless devices may initially use the composite overhead information in the OIS to determine the time-frequency location of each data stream of interest and may subsequently use the embedded overhead information to power on only during the time that the data stream is transmitted. The outer code rate and mode used for each MLC may be sent in the OIS or on a separate control channel. For clarity, the following description assumes that the OIS for each super-frame carries all parameters needed to receive each MLC sent in that super-frame.

Figure 4:
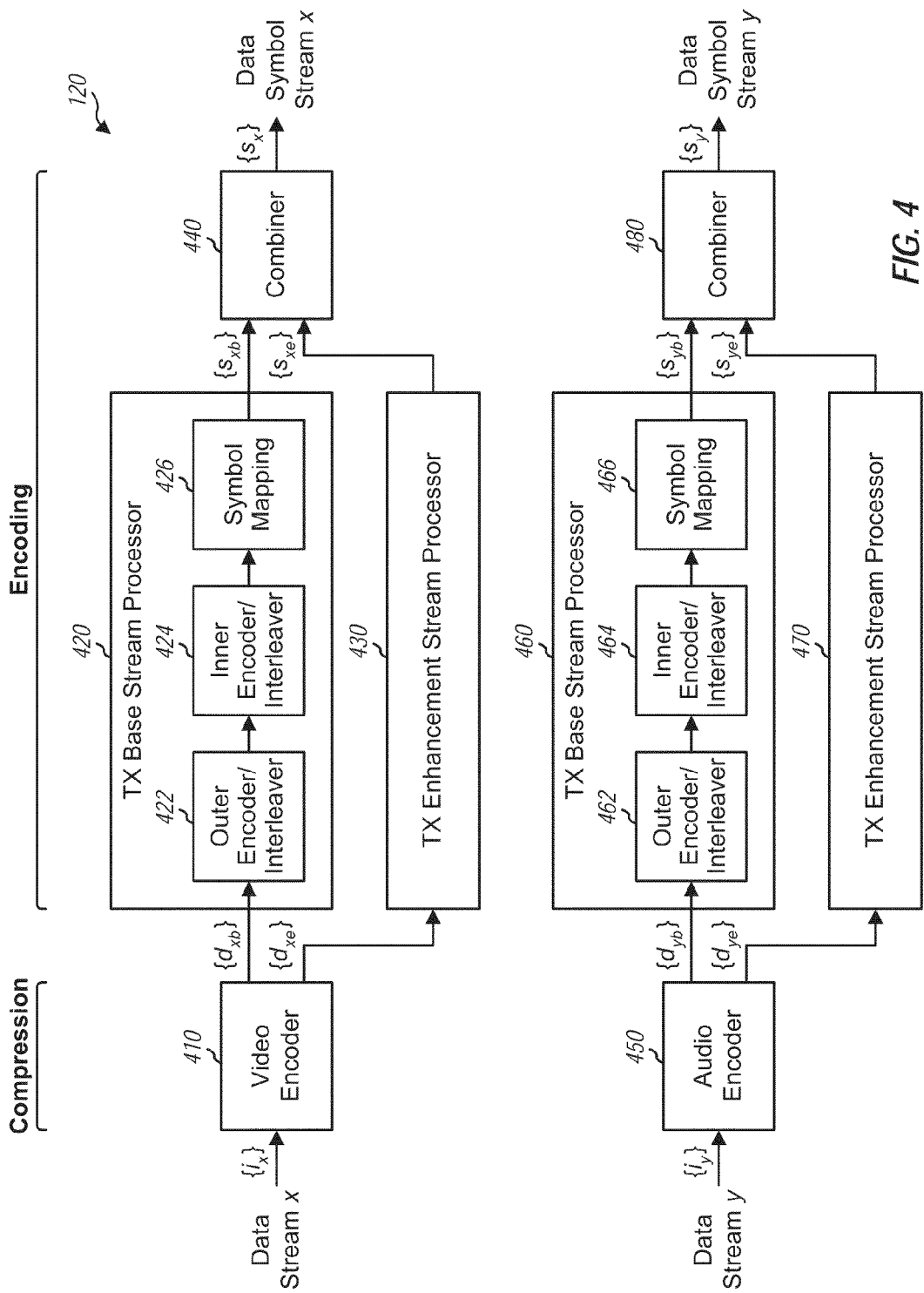
FIG. 4 shows a transmit (TX) data processor at the base station.

FIG. 4 shows a block diagram of an embodiment of TX data processor 120 at base station 110. For simplicity, FIG. 4 shows the processing for video and audio for one multimedia program. FIG. 4 also shows the use of "layered" coding whereby a data stream is sent as two substreams, which are called a base stream and an enhancement stream. The base stream may carry base information for all wireless devices, and the enhancement stream may carry additional information for wireless devices observing better channel conditions. With layered coding, the base and enhancement streams are encoded and modulated separately to generate two modulation symbol streams, which are then combined to obtain one data symbol stream.

Within TX data processor 120, a video encoder 410 receives and compresses a video data stream $\{i_x\}$ for the video portion of the multimedia program and provides a base stream $\{d_{xb}\}$ and an enhancement stream $\{d_{xe}\}$ for the video portion. Video encoder 410 may implement MPEG-2 (Moving Pictures Experts Groups) and may generate a sequence of intra-coded (I) frames, forward predicted (P) frames, and bi-directional predicted (B) frames for the video data stream. The base stream $\{d_{xb}\}$ may carry I and P frames, and the enhancement stream $\{d_{xe}\}$ may carry B and possibly P frames. In general, video encoder 410 may implement any video compression scheme, and the base and enhancement streams may carry any type and combination of frames.

A TX base stream processor 420 receives and processes the video base stream $\{d_{xb}\}$. Within processor 420, an outer encoder/interleaver 422 encodes each data block in the video base stream and generates a code block. Each data block contains K data packets and may be outer encoded, e.g., with an (N, K) Reed-Solomon code to generate a code block with N outer coded packets. For example, a data block with 12 data packets may be outer encoded with a rate 3/4 Reed-Solomon code to generate a code block with 16 outer coded packets. Outer encoder 422 also generates and appends to each outer coded packet a cyclic redundancy check (CRC) value used for error detection (i.e., to determine whether the packet is decoded correctly or in error). Interleaver 422 partitions each code block into four subblocks for the four frames and further interleaves (i.e., reorders) the outer coded packets for each frame. An inner encoder/interleaver 424 encodes each outer coded packet with, e.g., a Turbo code to generate an inner coded packet. Interleaver 424 interleaves the bits in each inner coded packet to generate an interleaved packet. A symbol mapping unit 426 maps the bits from interleaver 424 to modulation symbols based on the modulation scheme (e.g., QPSK or 16-QAM) selected for the video data stream and provides a first modulation symbol stream $\{s_{sb}\}$ for the video base stream.

A TX enhancement stream processor 430 processes the video enhancement stream $\{d_{xe}\}$ and provides a second modulation symbol stream $\{s_{xe}\}$. Processor 430 may use the same outer code, inner code, and modulation scheme used by processor 420 for the base stream, or different ones. A combiner 440 receives and scales the first and second modulation symbol streams with gains $G_{bs}$ and $G_{es}$, respectively, and combines the scaled modulation symbol streams to generate a data symbol stream $\{s_x\}$ for the video portion. The gains $G_{bs}$ and $G_{es}$ determine the amounts of transmit power (and thus the coverage areas) for the base and enhancement streams, respectively. If layered coding is not used, then video encoder 410 provides one data stream $\{d_x\}$, processor 420 encodes this data stream to generate the data symbol stream $\{s_x\}$, and processor 430 and combiner 440 are not needed.

An audio encoder 450 receives and encodes an audio data stream $\{i_y\}$ for the audio portion of the multimedia program and provides a base stream $\{d_{yb}\}$ and an enhancement stream $\{d_{ye}\}$ for the audio portion. Audio encoder 450 may implement any audio compression scheme. The base stream $\{d_{yb}\}$ may carry mono audio (e.g., left plus right, or L+R), and the enhancement stream $\{d_{ye}\}$ may carry stereo audio (e.g., left minus right, or L−R).

A TX base stream processor 460 receives and processes the audio base stream $\{d_{yb}\}$ and provides a first modulation symbol stream $\{s_{yb}\}$ for the audio base stream. Within processor 460, data blocks for the audio base stream are outer encoded and interleaved by an outer encoder/interleaver 462, further inner encoded and interleaved by an inner encoder/interleaver 464, and mapped to modulation symbols by a symbol mapping unit 466. A TX enhancement stream processor 470 processes the audio enhancement stream $\{d_{ye}\}$ and provides a second modulation symbol stream $\{s_{ye}\}$. A combiner 480 receives, scales, and combines the modulation symbol streams $\{s_{yb}\}$ and $\{s_{ye}\}$ and generates a data symbol stream $\{s_y\}$ for the audio portion. If layered coding is not used, then audio encoder 450 provides one data stream $\{d_y\}$, processor 460 encodes this data stream to generate the data symbol stream $\{s_y\}$, and processor 470 and combiner 480 are not needed.

Video encoder 410 and audio encoder 450 perform higher layer processing (or "compression") for the data streams. Processors 420, 430, 460, and 470 and combiners 440 and 480 perform physical layer processing (or "encoding") for the data streams. Other data streams for other multimedia programs and/or other content may be compressed and encoded in a manner similar to that shown in FIG. 4.

Figure 5:
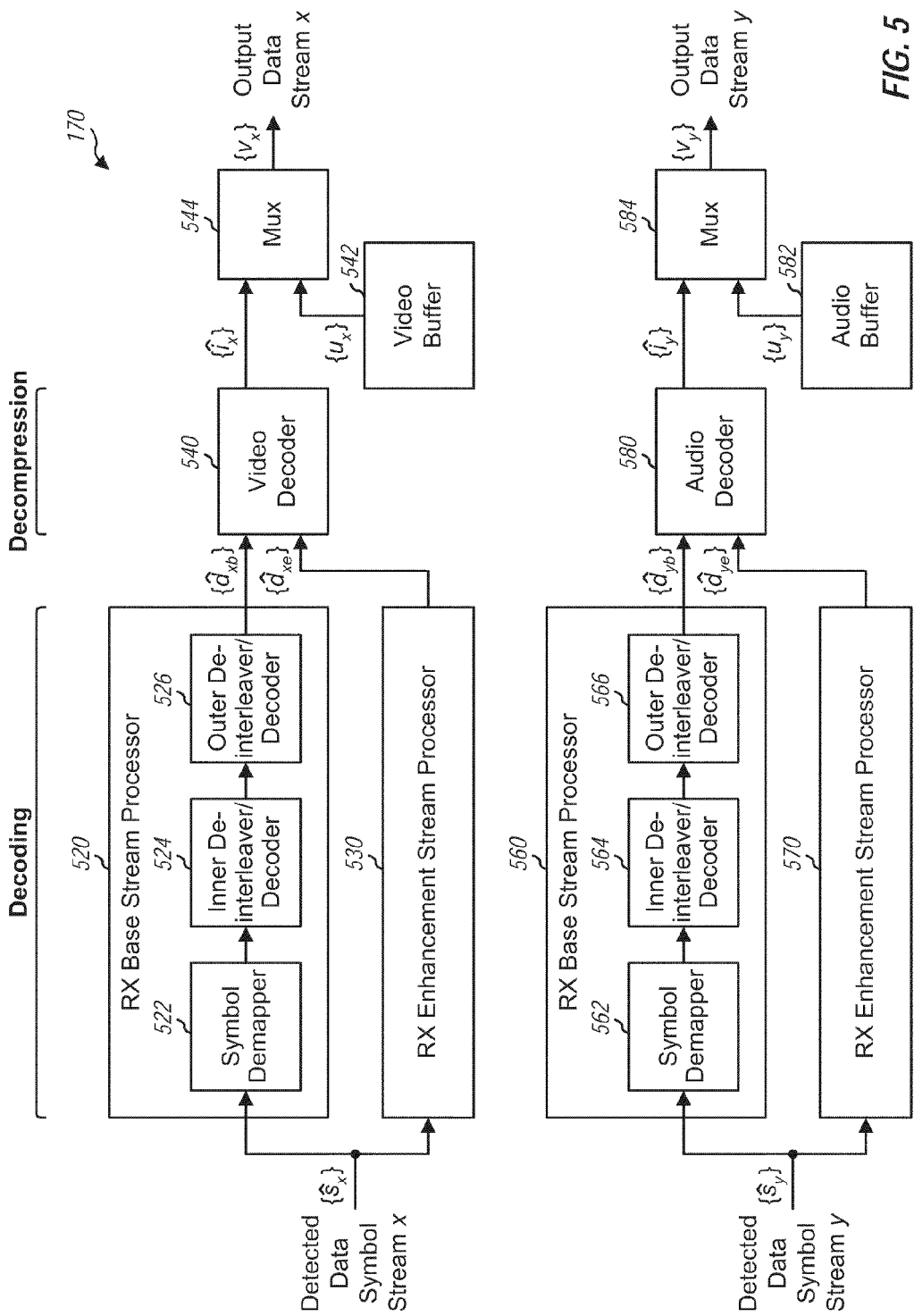
FIG. 5 shows a receive (RX) data processor at the wireless device.

FIG. 5 shows a block diagram of an embodiment of RX data processor 170 at wireless device 150. For simplicity, FIG. 5 shows the processing for video and audio for one multimedia program. Within RX data processor 170, an RX base stream processor 520 and an RX enhancement stream processor 530 receive from demodulator 160 a detected data symbol stream $\{\hat{s}\}$, which is an estimate of the data symbol stream $\{s_x\}$ for the video portion. Within processor 520, a symbol demapper 522 demaps the detected data symbols and provides detected bits, which may be represented as log-likelihood ratios (LLRs). Unit 522 may be part of demodulator 160 instead of RX data processor 170. An inner deinterleaver/decoder 524 deinterleaves and decodes the detected bits for each packet based on the inner code and provides an inner decoded packet. Decoder 524 also checks each inner decoded packet with the CRC value appended to the packet. An outer deinterleaver/decoder 526 deinterleaves the inner decoded packets for each frame. If any packet in a given code block is decoded in error, then decoder 526 performs outer decoding on N inner decoded packets for that code block based on, e.g., the (N, K) Reed-Solomon code and provides K outer decoded packets for the code block. The outer decoding may be skipped if no packets in the code block are inner decoded in error. Processor 520 provides a decoded video base stream $\{\hat{d}_{xb}\}$.

Processor 530 processes the detected data symbol stream $\{\hat{s}_x\}$ and provides a decoded video enhancement stream $\{\hat{d}_{xe}\}$. A video decoder 540 receives the decoded base and enhancement streams, performs video decompression in a complementary manner to the video compression performed at the base station, and provides a decompressed video data stream $\{i_x\}$. A multiplexer 544 receives the decompressed video data stream $\{i_x\}$ and an auxiliary video stream $\{u_x\}$ from a video buffer 542 and provides either stream $\{\hat{i}_x\}$ or $\{u_x\}$ as an output data stream $\{v_x\}$. Video buffer 542 may store pre-recorded video clips, logos, advertisements, text messages, and so on. For example, the content from video buffer 542 may be displayed between program changes to give the user an indication that acquisition of the new program is in progress.

An RX base stream processor 560 and an RX enhancement stream processor 570 receive a detected data symbol stream $\{\hat{s}_y\}$, which is an estimate of the data symbol stream $\{s_y\}$ for the audio portion of the multimedia program. Within processor 560, a symbol demapping unit 562 demaps the detected data symbols and provides detected bits. Unit 562 may be part of demodulator 160 instead of RX data processor 170. An inner deinterleaver/decoder 564 deinterleaves and decodes the detected bits for each packet and provides an inner decoded packet. Decoder 564 also checks each inner decoded packet with the CRC value appended to the packet. An outer deinterleaver/decoder 566 deinterleaves the inner decoded packets for each frame. For each code block with at least one packet error, decoder 566 performs outer decoding on the inner decoded packets for that code block and provides outer decoded packets. Processor 560 provides a decoded audio base stream $\{\hat{d}_{yb}\}$.

Processor 570 processes the detected data symbol stream $\{\hat{s}_y\}$ and provides a decoded audio enhancement stream $\{\hat{d}_{ye}\}$. An audio decoder 580 receives and decompresses the decoded base and enhancement streams in a complementary manner to the audio compression performed at the base station and provides a decompressed audio data stream $\{\hat{i}_y\}$. A multiplexer 584 receives the decompressed audio data stream $\{\hat{i}_y\}$ and an auxiliary audio stream $\{u_y\}$ from an audio buffer 582 and provides either stream $\{\hat{i}_y\}$ or $\{u_y\}$ as an output data stream $\{v_y\}$. Audio buffer 582 may store pre-recorded audio clips, advertisements, and so on.

Processors 520, 530, 560, and 570 perform physical layer receiver processing (or "decoding") for the data streams. Video decoder 540 and audio decoder 580 perform higher layer receiver processing (or "decompression") for the data streams. Other data streams for other multimedia programs and/or other content may be decoded and decompressed in a manner similar to that shown in FIG. 5.

1. Continued Decoding

Figure 6:
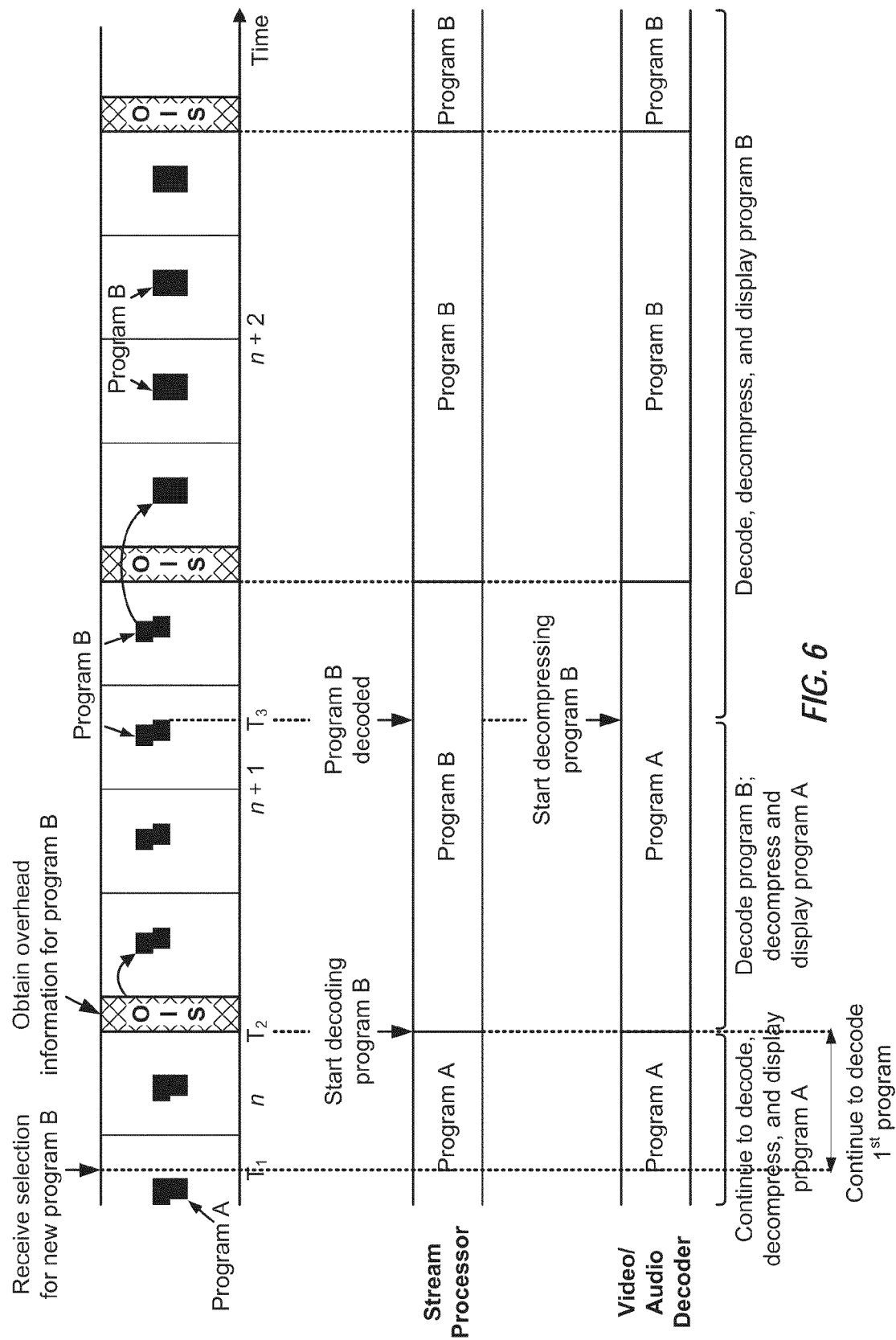
FIG. 6 shows a timeline for switching reception from program A to program B.

FIG. 6 shows a timeline for seamlessly switching reception from a current multimedia program A to a new multimedia program B. Initially, in super-frame n, the wireless device decodes, decompresses, and displays program A. At time $T_1$, the user selects the new program B. At this time, the wireless device does not have the overhead information needed to decode program B. Instead of freezing or blanking the display, the wireless device continues to decode, decompress, and (optionally) display program A in super-frame n.

At time $T_2$, which is the start of the next super-frame n+1, the wireless device receives the OIS for this super-frame and obtains overhead information for program B. The wireless device is able to start decoding program B in super-frame n+1 with this overhead information. The wireless device continues to decompress program A in super-frame n+1 with decoded data obtained in prior super-frame n for program A.

At time $T_3$, the wireless device completes the decoding of program B for super-frame n+1. If program B uses rate 3/4 Reed-Solomon code and parity packets for each code block are sent in frame 4, then the wireless device may recover all code blocks for program B in frame 3 if no packets are inner decoded in error, as shown in FIG. 6. The wireless device may start decompressing program B early in super-frame n+1 upon completing the decoding of the program (e.g., at time $T_3$, as shown in FIG. 6). The wireless device may also start decompressing program B earlier upon obtaining sufficient decoded data (e.g., an I frame) for program B. The wireless device may thus start decompressing program B early during super-frame n+1. Alternatively, the wireless device may start decompressing program B at the start of the next super-frame n+2 (not shown in FIG. 6).

The time between $T_1$ and $T_3$ may be viewed as the acquisition time for the new program B. The acquisition time is variable and depends on when the user selection is received, relative to the next OIS, and when the decompression of program B is initiated. This acquisition time may be relatively long if the OIS is sent infrequently (e.g., every 1 second) and/or if the decoding delay is long. The continued decoding, decompression, and (optional) displaying of program A during the acquisition time may provide better user experience than freezing or blanking the display during the entire acquisition time.

Figure 7:
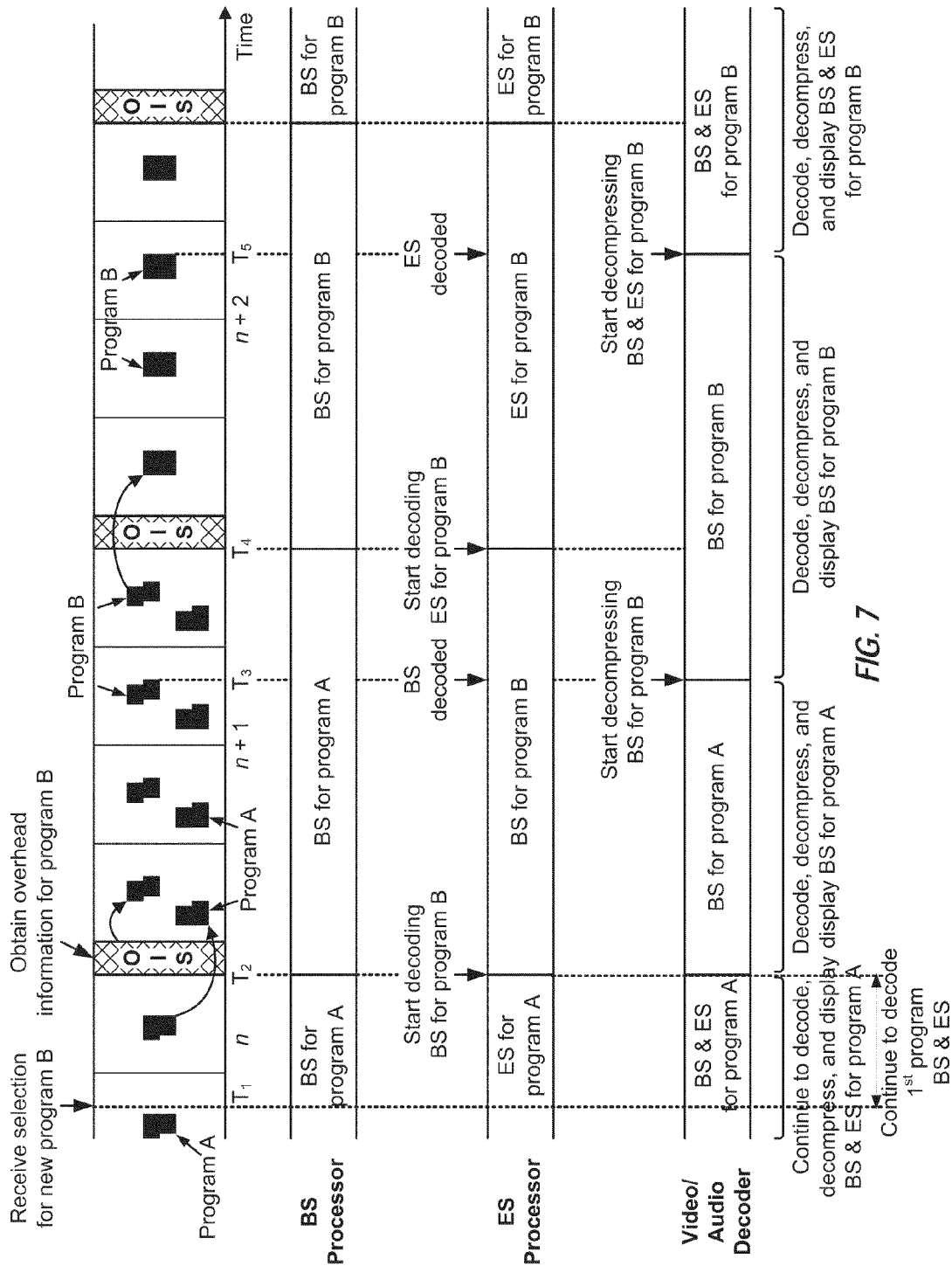
FIG. 7 shows a timeline for switching reception from program A to program B with layered coding used for both programs.

FIG. 7 shows a timeline for seamlessly switching reception from the current multimedia program A to the new multimedia program B with layered coding used for both programs. Initially, in super-frame n, the wireless device decodes, decompresses, and displays the base and enhancement streams (BS & ES) for program A. At time $T_1$, the user selects the new program B. Since the wireless device does not have the overhead information to decode program B at this time, the wireless device continues to decode, decompress, and (optionally) display program A in super-frame n.

At time $T_2$, the wireless device receives the OIS for the next super-frame n+1 and obtains overhead information for program B. In super-frame n+1, the wireless device continues to decode the base stream for program A (e.g., using processors 520 and 560 in FIG. 5) and starts decoding the base stream for program B (e.g., using processors 530 and 570 in FIG. 5, which are normally used for the enhancement stream but may also be configured to process the base stream). The wireless device also continues to decompress the base stream (or both the base and enhancement streams) for program A in super-frame n+1 with decoded data obtained for program A in prior super-frame n.

At time $T_3$, the wireless device completes the decoding of the base stream for program B. The wireless device may start decompressing program B early in super-frame n+1 (e.g., at time $T_3$, as shown in FIG. 7) or at the beginning of the next super-frame n+2. In super-frame n+2, the wireless device terminates the decoding of program A and performs decoding of the base and enhancement streams for program B. The wireless device also decompresses the base stream for program B with decoded data obtained for this base stream in the prior super-frame n+1. At time $T_5$, the decoded data for the enhancement stream for program B is available. The wireless device may start decompressing both the base and enhancement streams for program B early (e.g., at time $T_5$, as shown in FIG. 7) or at the beginning of the next super-frame n+3.

As shown in FIG. 7, the transition from the current program A to the new program B may be made "smoother" if both programs are transmitted using layered coding. The wireless device may switch from program A to program B in stages. The wireless device receives both the base and enhancement streams for program A in the first stage, then the base stream for program A in the second stage, then the base stream for program B in the third stage, then both the base and enhancement streams for program B in the fourth stage. One or more of the stages may be omitted, for example, if program A or B is not transmitted with layered coding, if the switching is performed in few super-frames (as shown in FIG. 7), and so on.

Figure 8:
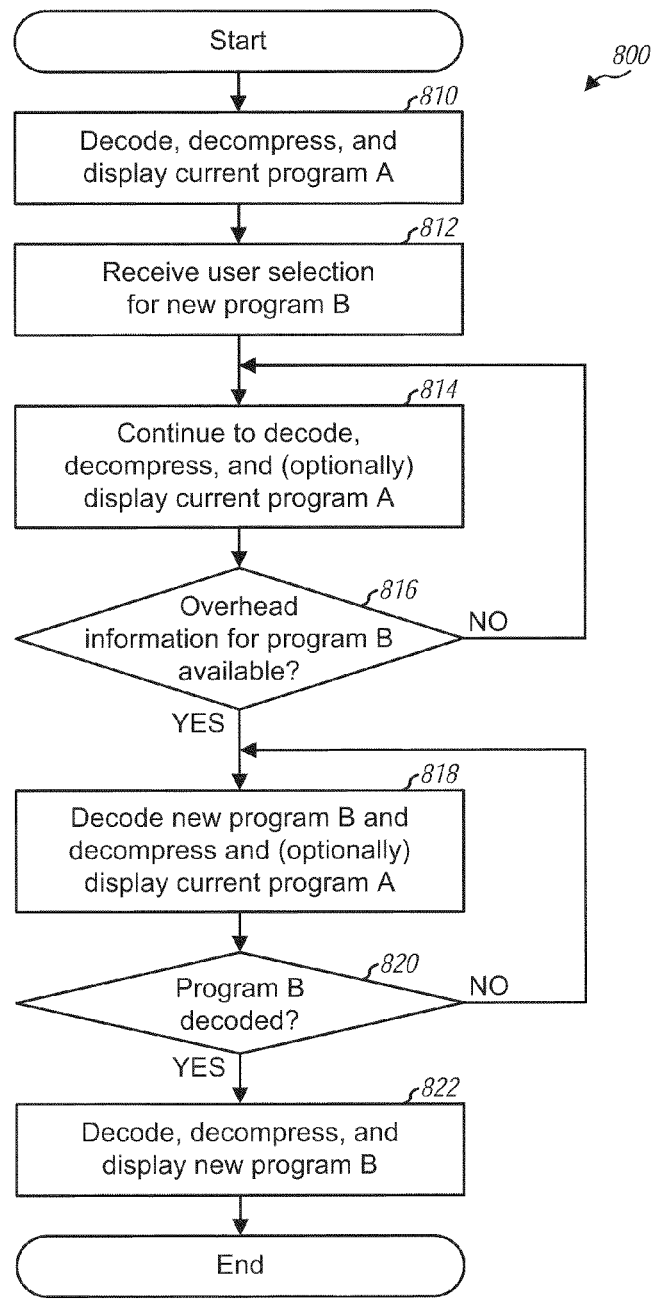
FIG. 8 shows a process for switching reception from program A to program B.

FIG. 8 shows a flow diagram of a process 800 for switching reception from the current multimedia program A to the new multimedia program B. The wireless device receives, decodes, decompresses, and displays the current program A (block 810). The wireless device receives a user selection for the new program B (block 812). The wireless device continues to decode, decompress, and (optionally) display the current program A (block 814) until the overhead information for the new program B is available, as determined in block 816. At this time, the wireless device decodes the new program B but continues to decompress and (optionally) display the current program A (block 818). Once the new program B is decoded, as determined in block 820, the wireless device decodes, decompresses, and displays the new program B (block 822).

2. Early Decoding

The description above for "continued decoding" assumes that the wireless device has no information for a program change prior to the user selection of the new program. If this is the case, then the wireless device starts decoding the new program after receiving the user selection. However, in many instances, the wireless device has information regarding the user's prior actions and may use this information to anticipate or predict the user's future selection. The wireless device may perform "early" decoding of a program, prior to its selection by the user, in order to achieve faster switching between programs. The early decoding may be performed in various manners, as described below.

Figures 9, 10:
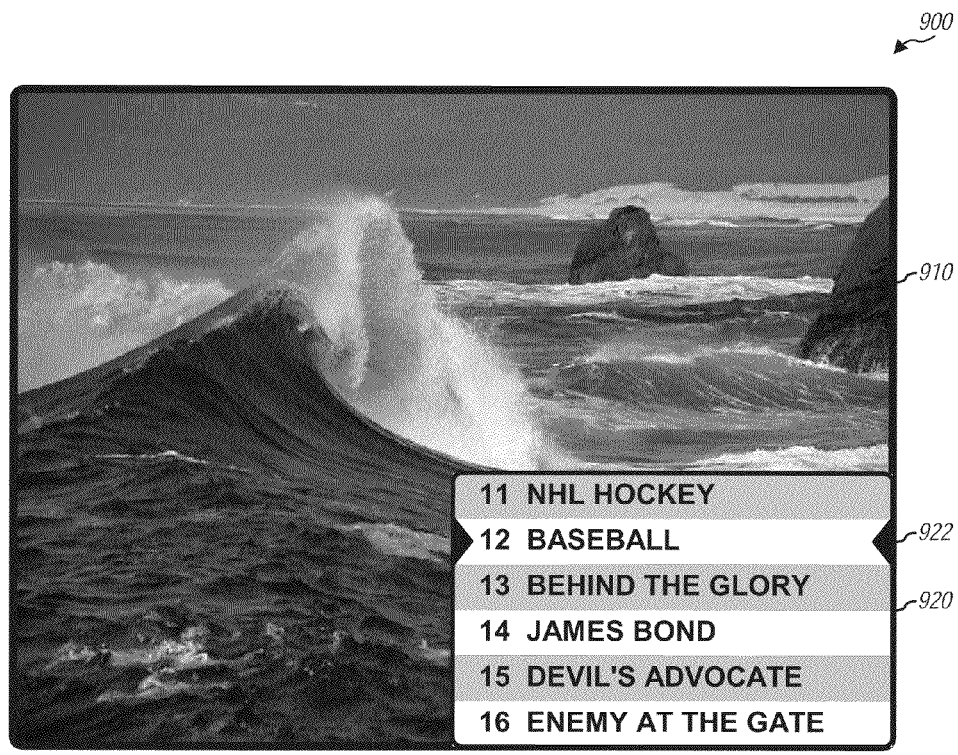
FIG. 9 shows an exemplary display screen.
FIG. 10 shows an exemplary table maintained for a program guide.

FIG. 9 shows an exemplary display screen 900 generated by the wireless device. For this embodiment, display screen 900 includes two regions 910 and 920. Region 910 shows the video for the currently selected multimedia program. Region 920 shows a program guide (PG), which may list the programs being shown on various program channels. In general, display screen 900 may include any number of regions for showing any type of content.

The user may bring up the program guide at any time by clicking on an appropriate key (e.g., "program menu" key) on the wireless device or a remote control unit. The wireless device may also automatically bring up the program guide if the user clicks on any one of a designated set of keys (e.g., a "scroll up" or "scroll down" button). In any case, the wireless device may monitor user navigation through the program guide to anticipate the next program selection.

For the embodiment shown in FIG. 9, the program guide displays a listing of program channels and the programs currently being shown on these channels. A cursor 922 indicates the program currently highlighted. Cursor 922 moves up and down the program guide in response to user key action. If the user moves the cursor past the top or the bottom of region 920, then another section of the program guide is retrieved and displayed in region 920.

FIG. 10 shows an exemplary table 1000 maintained by the wireless device for the program guide. Table 1000 may be stored in a cache within the wireless device for quick access. Table 1000 includes a column 1012 that stores the program channels, a column 1014 that stores the program name, a column 1016 that stores the MLCs used to carry each program, a column 1018 that stores pertinent parameters for each MLC, and a column 1020 that stores the time-frequency location of each MLC for the current super-frame. The base station transmits the information for columns 1012 through 1018, which may change infrequently, and the wireless device updates this information as necessary. The time-frequency location for each MLC may change in each super-frame. If the wireless device is continuously receiving the currently selected multimedia program, then the time-frequency location for each MLC used for this program may be obtained from the embedded overhead information sent on that MLC, as described above. The wireless device would not need to wake up and receive the OIS. In this case, the information in column 1020 would be stale for all MLCs except for those used for the currently selected program.

If the wireless device detects that the user may be changing program (e.g., based on key/button activity), then the wireless device may start receiving the OIS in each super-frame. The wireless device may save the overhead information for (1) the MLCs used for the programs displayed in region 920 for the program guide, (2) all MLCs sent in the current super-frame, or (3) some other group of MLCs. The wireless device would then be able to start decoding any of these MLCs in the current super-frame, without having to wait for the OIS in the next super-frame.

The wireless device may be able to recover a code block sent on a given MLC without receiving the entire code block. For example, if a rate 3/4 Reed-Solomon code is used for the code block and the code block is partitioned into four sub-blocks and sent in four frames of one super-frame (as shown in FIG. 3), then the wireless device may be able to recover the code block with just three of these subblocks. The wireless device may be able to recover the code block by decoding the MLC starting in either frame 1 or 2. Thus, if an indication to decode the MLC is received during frame 1, then the wireless device can start decoding this MLC in frame 2 and does not need to wait until the next super-frame.

Referring back to FIG. 9, as the user navigates through the program guide, cursor 922 indicates the program currently highlighted. The wireless device may start decoding the highlighted program as soon as the overhead information for the MLCs used for this program is available. The wireless device may simultaneously decode the currently selected program and the highlighted program if sufficient resources are available at the device, as described above. In one embodiment, the wireless device starts decompressing the highlighted program as soon as decoded data for this program is available. The wireless device may optionally display this highlighted program after it has been decompressed. In another embodiment, the wireless device continues to decode, decompress, and display the currently selected program until the user selects the highlighted program. For this embodiment, the wireless device uses the decoded data for the highlighted program to quickly switch to this program upon user selection.

If layered coding is not used for the highlighted program, then the wireless device may decode the highlighted program while decompressing the currently selected program, e.g., as shown in FIG. 6. The wireless device may decompress and display the highlighted program as soon as decoded data is available for this program. If layered coding is used for the currently selected program and the highlighted program, then the wireless device may switch between programs in stages, e.g., as shown in FIG. 7. The wireless device may decode the base streams for both programs and may decompress and display the base stream for the currently selected program. The wireless device may decompress and display the base stream for the highlighted program (1) as soon as decoded data is available for this program and/or (2) if the user selects this program. The wireless device may decode, decompress, and display the base and enhancement streams for the highlighted program if the user selects this program.

If the wireless device is decoding the currently highlighted program Y and the user highlights another program Z, then the wireless device terminates the processing of program Y and starts decoding program Z as soon as overhead information for program Z is available. The wireless device follows the user navigation through various programs and attempts to decode whichever program that is currently highlighted. This allows the wireless device to quickly switch to the latest highlighted program, if it is subsequently selected by the user.

The wireless device may perform early decoding of the highlighted program without considering other information, as described above. The wireless device may also anticipate the next user selection based on other information such as, for example, the direction of scroll, the speed of scroll, the manner of scroll, and so on.

For example, the user may continuously press the "scroll up" button if the user is trying to reach a specific program channel that is relatively far from the current program channel. In this case, the wireless device may ignore the rapidly changing highlighted programs, until the "scroll up" button is released. The wireless device may then perform early decoding of the latest highlighted program after the release of the button. Alternatively, the wireless device may decode a program that is in advance of the currently highlighted program. This "future" program may be determined based on the direction and speed of scroll. Displaying intermediate programs during a fast scroll can provide good feedback to the user.

As another example, the user may click on the "scroll up" button at a somewhat periodic rate to surf program channels. In this case, the wireless device may decode, decompress, and display each highlighted program for which sufficient time is given to perform these tasks. The wireless device may also decode one or more programs ahead of the currently highlighted program (if resources are available) in anticipation of the user navigating in this direction. For example, if four programs A, B, C and D are ordered from A through D, when the wireless device may starting acquiring programs B and C upon receiving a channel up in program A. The wireless device may abandon program B and start acquiring programs C and D upon receiving a channel up in program B. The wireless device may also start acquiring multiple programs in multiple directions (e.g., in opposite directions of a channel scroll).

The user may select a new program by directly entering its channel number via a numeric keypad. The wireless device may initiate early decoding based on the keys entered by the user. For example, the user may click on "3" followed by "8" and then "enter" to go to program channel 38. Upon receiving the "3" keystroke from the user, the wireless device may start early decoding of program channel 3 (in anticipation of the user selecting this channel) and/or save overhead information for program channels 30 through 39 (in anticipation of the user selecting one of these channels). Upon receiving the "8" keystroke, the wireless device may start early decoding of program channel 38 in anticipation of the user selecting this channel. Upon receiving the "enter" keystroke, the wireless device may decompress and display this channel.

The wireless device may also save overhead information and/or perform early decoding for programs that are visited often. For example, the user may frequently or continually jump between two programs of interest (e.g., by clicking on a "jump" button). Upon detecting this condition, the wireless device may decode both programs in anticipation of the next jump. The user may also scroll back and forth between a small range of program channels. Upon detecting this condition, the wireless device may decode the next program in anticipation of the next channel change in the scroll.

In general, the wireless device may use any pertinent information for early decoding of programs. Different key inputs (e.g., "scroll up", "jump", numeric number, and so on) may provide different information that may be used by the wireless device to anticipate the next user selection. The wireless device may perform early decoding of any program anticipated to be selected by the user, e.g., the currently highlighted program, a program in the direction of scroll, and so on.

Figure 11:
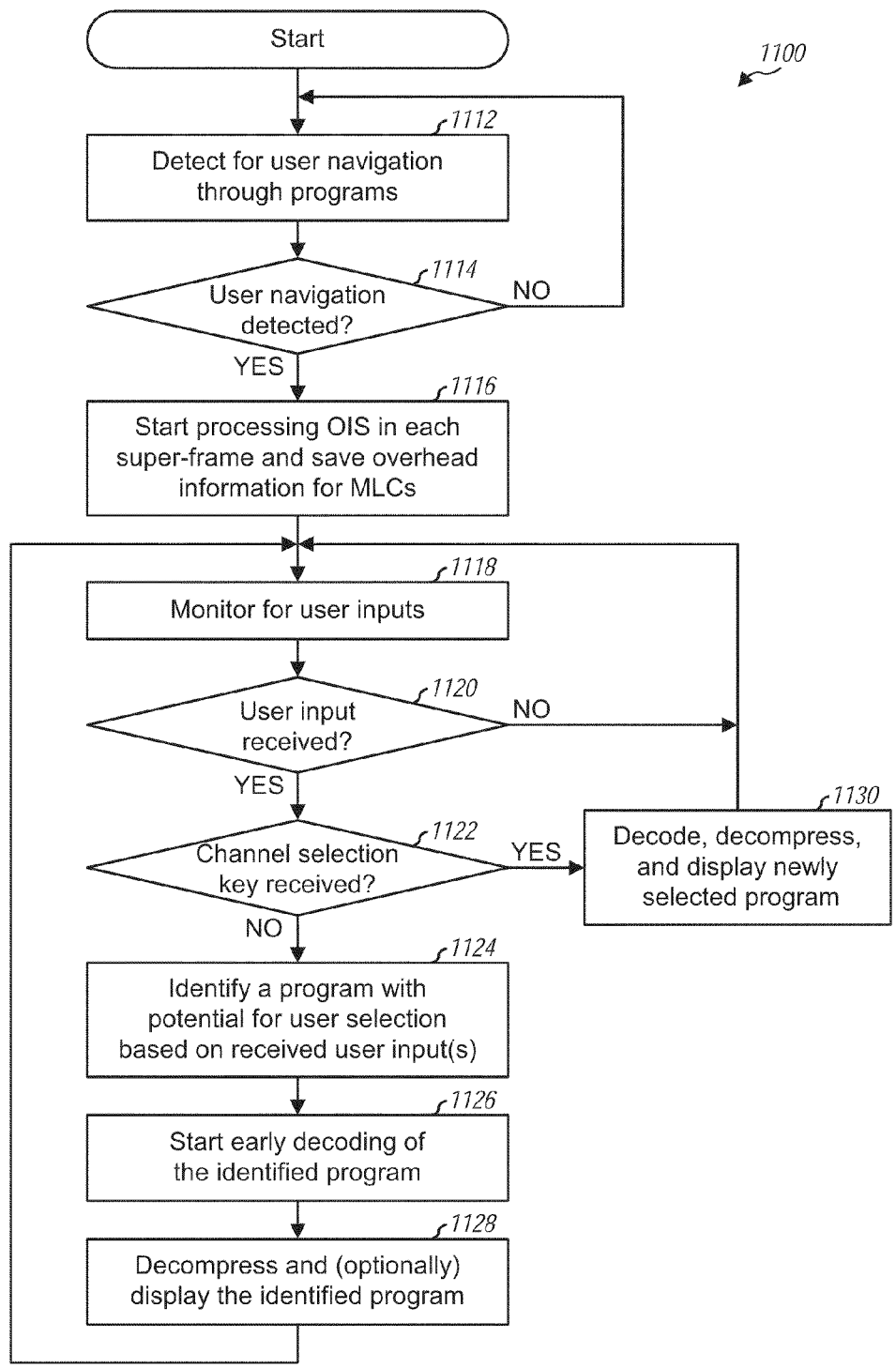
FIG. 11 shows a process for switching reception between programs with early decoding.

FIG. 11 shows a flow diagram of a process 1100 for switching reception between multimedia programs with early decoding. The wireless device detects for user navigation through programs, e.g., based on key/button activity (block 1112). If user navigation is detected, as determined in block 1114, then the wireless device starts processing the OIS in each super-frame and saves overhead information for MLCs of interest (block 1116). For example, the wireless device may save overhead information for all MLCs, or just MLCs used for the programs displayed on the program guide screen, or some other group of MLCs.

After user navigation has been detected, the wireless device thereafter monitors for user inputs (block 1118). If a user input is received, as determined in block 1120, then the wireless device determines whether this user input is a channel selection key (block 1122). Channel selection keys are keys indicative of user selection for a new program channel and may include "enter", "channel up", "channel down", and "jump" keys. If a channel selection key is not received, then the wireless device identifies a program with potential for user selection based on user input(s) received thus far (block 1124). This program may be the currently highlighted program or a program anticipated to be selected based on numeric and/or non-numeric key inputs, as described above. The wireless device starts early decoding of this identified program (block 1126). The wireless device may also decompress and (optionally) display the program prior to user selection (block 1128). Alternatively, the wireless device may wait for the user selection of this program before decompressing and displaying the program (not shown in FIG. 11). The process then returns to block 1118.

Back in block 1122, if a channel selection key is received, then the wireless device switches to the newly selected program, which may be the program identified based on prior user input(s). The wireless device then decodes, decompresses, and displays this selected program (block 1130). The process may then return to block 1118 (as shown in FIG. 11) or to block 1112.

The wireless device may perform blocks 1112 through 1116 in response to receiving the first user input after a period of key/button inactivity. The first user input would also trigger blocks 1118 and 1120 and would be appropriately processed.

For clarity, program selection via a program guide has been described above. Programs may also be selected in other manners, e.g., using other on-screen selection methods. For example, a display screen may show one or more icons, and each icon may represent a specific program. In any case, the wireless device may start the acquisition (e.g., decoding) of a program early as soon as the program is highlighted and may switch to this program upon selection by the user. The user perceives faster acquisition speed since the acquisition process is started early prior to the user selection.

The continued decoding and the early decoding techniques may be used for one or more data streams associated with multimedia programs. For example, continued decoding or early decoding may be performed for only the audio portion/component, or only the video portion, or both the audio and video portions of the current and new multimedia programs. Blocks 810, 814, 818, and 822 in FIG. 8 and blocks 1126, 1128, and 1130 in FIG. 11 may thus be performed for the audio portion, the video portion, or both the audio and video portions of the current and new multimedia programs.

The resources at the wireless device may also be configured to receive different portions/components for different multimedia programs. For example, RX data processor 170 may concurrently decode and decompress the audio portion of one program and the video portion of another program. This allows the user to view and listen to two different programs simultaneously. The continued decoding and early decoding techniques allow the user to more seamlessly switch the audio and/or video portion of the two programs. For example, the user may simultaneously watch a baseband game and listen to music. If the game becomes interesting, then the user can more seamlessly switch from the music to the audio portion of the game. The user may also watch one game and listen to another game simultaneously, and may switch the video and/or audio to the more interesting game whenever an exciting event occurs.

3. Time-Compensated Video and Audio Transmission

The video and audio decoders at the wireless device require a certain amount of time to perform video and audio decompression, respectively. The base station may transmit video and audio in a manner to improve acquisition of new programs.

Figure 12:
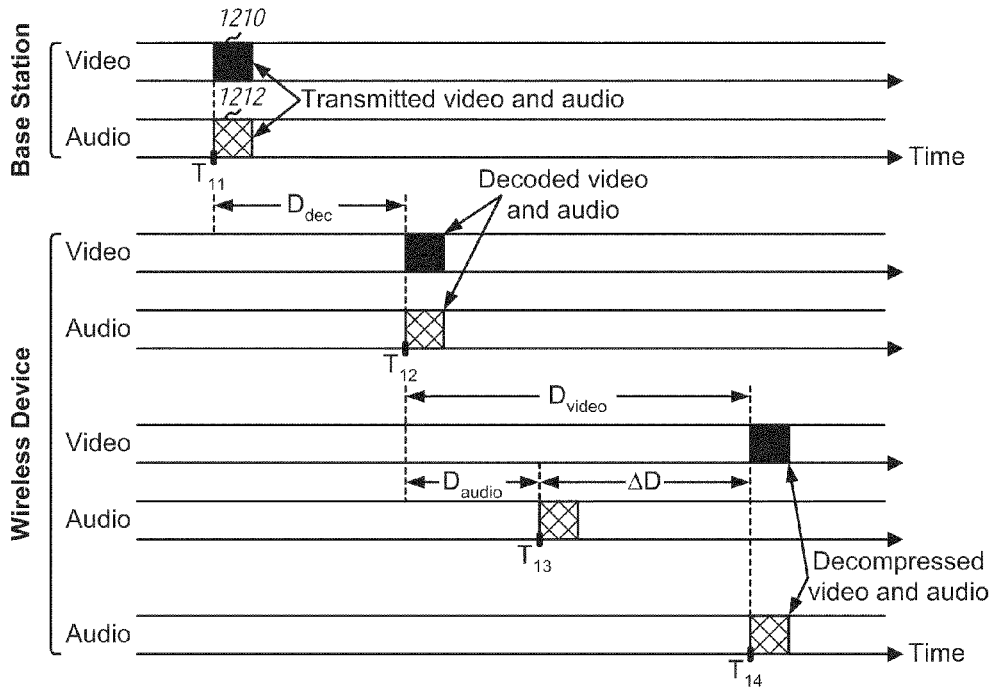
FIG. 12 shows time-aligned transmission of video and audio.

FIG. 12 shows transmission of video and audio time-aligned at the base station. A video portion 1210 and an audio portion 1212 are designated to be played together and are transmitted by the base station time-aligned at time $T_{11}$. The wireless device receives the video and audio portions, decodes each portion, and completes the decoding of these portions at time $T_{12}$. For simplicity, FIG. 12 shows the same transmission and decoding delay of $D_{dec}$ for the video and audio portions. The wireless device then decompresses the decoded video and audio portions separately using the video and audio decoders, respectively. FIG. 12 shows a video decompression delay of $D_{video}$ and an audio decompression delay of $D_{audio}$, where $D_{video}$ is typically larger than $D_{audio}$ and may be much larger than $D_{audio}$, e.g., if frames are transmitted out of sequence for improved compression performance. The wireless device would then complete the audio decompression early at time $T_{13}$. The wireless device typically buffers the decoded audio (instead of the decompressed audio, which contains more bits) by the difference in the decompression delays (i.e., by $\Delta D = D_{video} - D_{audio}$). This buffering allows the video and audio portions to be played together when the video decompression is completed at time $T_{14}$.

Figure 13:
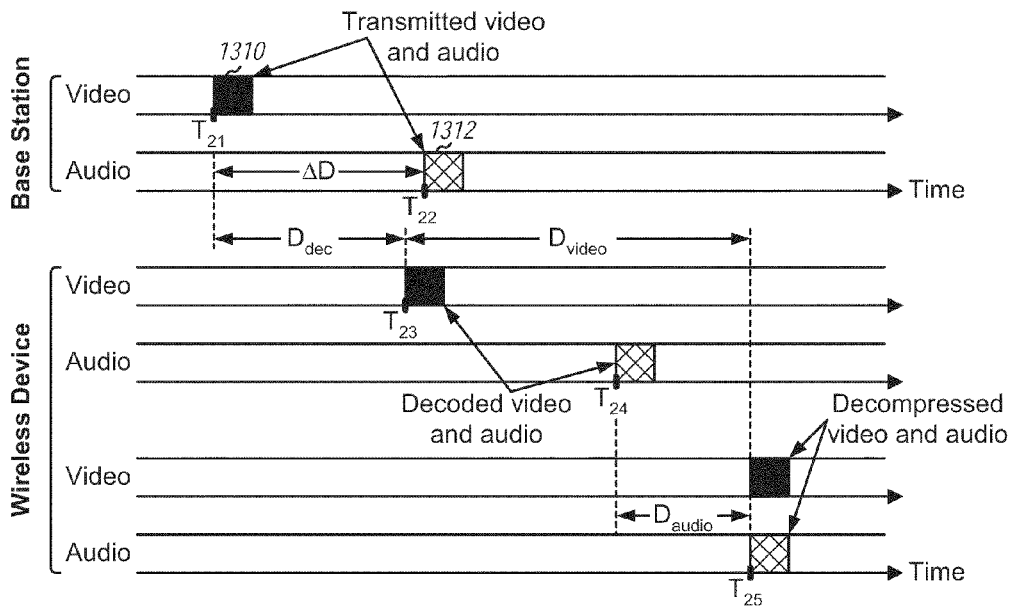
FIG. 13 shows time-compensated transmission of video and audio.

FIG. 13 shows transmission of video and audio with time compensation to account for the difference in video and audio decompression delays. A video portion 1310 and an audio portion 1312 are designated to be played together but are transmitted by the base station at different times $T_{21}$ and $T_{22}$, respectively. The wireless device receives the video and audio portions, decodes each portion, completes the video decoding at time $T_{23}$, and completes the audio decoding at time $T_{24}$. The wireless device decompresses the decoded video and audio portions separately and completes the decompression of both portions at approximately time $T_{25}$. The video decompression delay is $D_{video}$ and the audio decompression delay is $D_{audio}$, which are the same as shown in FIG. 12. However, video portion 1310 has been transmitted early with respect to audio portion 1312 by the delay difference of $\Delta D$, or $\Delta D = T_{22} - T_{21}$.

With the delay-compensated transmission shown in FIG. 13, the wireless device can play the audio as soon as it is decompressed, without having to buffer the audio and wait for the video decompression to complete. Playing the audio as soon as possible (and earlier than the video because of the shorter decompression delay) is desirable to provide a faster response for a program change. The response time for the time-compensated transmission in FIG. 13 is faster than the response time for the time-aligned transmission in FIG. 12 by the delay difference of $\Delta D$. Since the audio carries pertinent information for many programs such as news, weather, and so on, the user can enjoy the audio even without the video.

The various techniques for seamlessly switching reception (e.g., the continued decoding, early decoding, switching in stages with the base stream and enhancement stream, and time-compensated video and audio transmission) may be applied individually. These techniques may also be applied in various different combinations. For example, the early decoding may be performed in combination with the switching in stages, as described above.

The seamless switching reception techniques described herein may be implemented by various means. For example, these techniques may be implemented in hardware, software, or a combination thereof. For a hardware implementation, the processing units used to support or perform seamless switching of reception may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in a memory unit (e.g., memory unit 142 or 192 in FIG. 1) and executed by a processor (e.g., controller 140 or 190). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of switching reception between multimedia programs in a wireless communication system, the method comprising:
   decoding at least one portion of a first program obtained from a first data frame;
   receiving user selection for a second program, the second program being different from the first program;
   obtaining from the first data frame overhead information associated with decoding the second program from a second data frame, wherein the overhead information includes at least time-frequency location of the second program within the second data frame;
   continuing the decoding of the at least one portion of the first program after receiving the user selection for the second program at least until the overhead information for the second program is obtained; and
   decoding at least one portion of the second program after obtaining the overhead information for the second program.

2. The method of claim 1, wherein the at least one portion of the first program comprises an audio portion.

3. The method of claim 1, wherein the at least one portion of the first program comprises a video portion.

4. The method of claim 1, further comprising:
   decompressing the at least one portion of the first program until the overhead information for the second program is obtained.

5. The method of claim 4, wherein the decompressing the at least one portion of the first program comprises video decoding a video portion of the first program.

6. The method of claim 4, wherein the decompressing the at least one portion of the first program comprises audio decoding an audio portion of the first program.

7. The method of claim 1, further comprising:
   decompressing the at least one portion of the first program until the at least one portion of the second program is decoded.

8. The method of claim 7, further comprising:
   decompressing the at least one portion of the second program after the at least one portion of the second program is decoded.

9. The method of claim 7, further comprising:
   displaying the at least one portion of the first program while the overhead information for the second program is being obtained and until the at least one portion of the second program is decoded.

10. The method of claim 1, further comprising:
    providing an indication that the second program is being decoded after receiving the user selection for the second program.

11. The method of claim 1, wherein the decoding of the at least one portion of the first program and the decoding of the at least one portion of the second program are for physical layer decoding.

12. The method of claim 1, further comprising:
    switching reception between the first program and the second program after decoding at least one portion of the second program.

13. An apparatus for switching reception between multimedia programs in a wireless communication system, the apparatus comprising:
    a controller operative to:
        direct decoding of at least one portion of a first program obtained from a first data frame, and
        receive user selection for a second program, the second program being different from the first program; and
    a data processor operative to:
        decode from the first data frame the at least one portion of the first program when directed by the controller,
        obtain from the first data frame overhead information associated with decoding the second program from the second data frame, wherein the overhead information includes at least time-frequency location of the second program within the second data frame,
        continue to decode the at least one portion of the first program after receiving the user selection for the second program at least until the overhead information for the second program is obtained; and
        decode at least one portion of the second program after obtaining the overhead information for the second program.

14. The apparatus of claim 13, wherein the at least one decoder is further operative to decompress the at least one portion of the first program until the at least one portion of the second program is decoded.

15. The apparatus of claim 14, wherein the at least one decoder is further operative to decompress the at least one portion of the second program until after the at least one portion of the second program is decoded.

16. The apparatus of claim 13, wherein the data processor is further operative to provide an indication that the second program is being decoded after receiving the user selection for the second program.

17. The apparatus of claim 13, further comprising:
at least one decoder operative to decompress the at least one portion of the first program until the overhead information for the second program is obtained.

18. The apparatus of claim 17, wherein the at least one decoder operative to decompress the at least one portion of the first program comprises video decoding a video portion of the first program.

19. The apparatus of claim 17, wherein the at least one decoder operative to decompress the at least one portion of the first program comprises audio decoding an audio portion of the first program.

20. The apparatus of claim 13, further comprising:
a display unit operable to display the at least one portion of the first program while the overhead information for the second program is obtained and until the at least one portion of the second program is decoded.

21. The apparatus of claim 13, further comprising:
a receiver unit operable to obtain the first and second programs via a single radio frequency (RF) channel.

22. The apparatus of claim 13, further comprising:
switch reception between the first program and the second program after decoding at least one portion of the second program.

23. An apparatus for switching reception between multimedia programs in a wireless communication system, the apparatus comprising:
means for decoding at least one portion of a first program obtained from a first data frame;
means for receiving user selection for a second program, the second program being different from the first program;
means for obtaining from the first data frame overhead information associated with decoding the second program from the second data frame, wherein the overhead information includes at least time-frequency location of the second program within the second data frame;
means for continuing the decoding of the at least one portion of the first program after receiving the user selection for the second program at least until the overhead information for the second program is obtained; and
means for decoding at least one portion of the second program after receiving the overhead information for the second program.

24. The apparatus of claim 23, further comprising:
means for decompressing the at least one portion of the first program until the at least one portion of the second program is decoded.

25. The apparatus of claim 24, further comprising:
means for decompressing the at least one portion of the second program after the at least one portion of the second program is decoded.

26. The apparatus of claim 23, further comprising:
means for providing an indication that the second program is being decoded after receiving the user selection for the second program.

27. The apparatus of claim 23, further comprising:
means for obtaining the first and second programs via a single radio frequency (RF) channel.

28. The apparatus of claim 23, further comprising:
means for decompressing the at least one portion of the first program until the overhead information for the second program is obtained.

29. The apparatus of claim 28, wherein the means for decompressing the at least one portion of the first program comprises video decoding a video portion of the first program.

30. The apparatus of claim 28, wherein the means for decompressing the at least one portion of the first program comprises audio decoding an audio portion of the first program.

31. The apparatus of claim 23, further comprising:
means for displaying the at least one portion of the first program while the overhead information for the second program is being obtained and until the at least one portion of the second program is decoded.

32. The apparatus of claim 23, further comprising:
means for switching reception between the first program and the second program after decoding at least one portion of the second program.

33. A method of receiving multimedia programs in a wireless communication system, the method comprising:
decoding a first base stream and a first enhancement stream for a first program from a first data frame in a first time interval, the first base stream carrying base information for the first program and the first enhancement stream carrying additional information for the first program;
obtaining from the first data frame overhead information associated with decoding a second program from a second data frame, wherein the overhead information includes at least time-frequency location of the second program within the second data frame; and
decoding the first base stream for the first program from the first data frame and simultaneously decoding the second base stream for the second program from the second data frame in a second time interval after the first time interval.

34. The method of claim 33, further comprising:
decoding the second base stream and a second enhancement stream for the second program from the second data frame in a third time interval after the second time interval.

35. The method of claim 33, further comprising:
receiving an indication to start decoding the second program, and wherein the decoding of the first base stream and the second base stream is initiated in response to receiving the indication.

36. The method of claim 33, further comprising:
receiving an indication to switch from the first program to the second program, and wherein the decoding of the second base stream and the second enhancement stream is initiated in response to receiving the indication.

37. The method of claim 36, further comprising:
receiving a user input selecting the second program, and wherein the indication to switch to the second program is in response to the second program being selected.

38. The method of claim 33, further comprising:
decompressing the first base stream and the first enhancement stream decoded in the first time interval; and
decompressing the first base stream decoded in the second time interval.

39. The method of claim 38, further comprising:
terminating the decompression of the first base stream after the first time interval; and
decompressing the second base stream decoded in the second time interval.

40. The method of claim 39, further comprising:
decompressing the second base stream and the second enhancement stream decoded in the third time interval.

41. A device for switching reception between multimedia programs in a wireless communication system, the device comprising:
- a user interface for receiving user selection of a multimedia program;
- a communication component configured to:
  - receive a plurality of streams containing user selected multimedia programs, wherein the streams are carried in a plurality of data frames; and
- a processor coupled to the user interface and to the communication component, the processor configured to:
  - decode from a first set of data frames received by the communication component a first base stream and a first enhancement stream for a first program, the first base stream carrying base information for the first program and the first enhancement stream carrying additional information for the first program;
  - receive from the user interface a user selection for a second program, the second program being different from the first program;
  - obtain from the first data frame overhead information associated with decoding the second program from a second data frame, wherein the overhead information includes at least time-frequency location of the second program within the second data frame; and
  - continue decoding the first base stream for the first program and simultaneously begin decoding a second base stream for a second program obtained from the second data frame.

42. The method of claim 41, wherein the communication component is further configured to:
- switch reception between the first and second programs after decoding at least one portion of the second program.

43. A method of switching reception between multimedia programs in a wireless communication system, the method comprising:
- decoding and decompressing at least one portion of a first program obtained from a first data frame;
- receiving a user input;
- identifying a second program with potential for user selection based on the user input, the second program being different from the first program; and
- obtaining from the first data frame overhead information associated with decoding the second program from a second data frame, wherein the overhead information includes at least time-frequency location of the second program within the second data frame; and
- initiating decoding of at least one portion of the second program from the second data frame prior to user selection of the second program while continuing to decompress the at least one portion of the first program.

44. The method of claim 43, wherein the receiving the user input comprises receiving the user input highlighting the second program.

45. The method of claim 43, further comprising:
- identifying a third program with potential for user selection based on the user input; and
- initiating decoding of at least one portion of the third program prior to user selection of the third program.

46. The method of claim 45, wherein the second and third programs are for different directions of a channel scroll.

47. The method of claim 43, further comprising:
- decompressing the at least one portion of the second program after completing the decoding of the at least one portion of the second program.

48. The method of claim 43, further comprising:
- receiving user selection for the second program; and
- decompressing the at least one portion of the second program after completing the decoding of the at least one portion of the second program and in response to receiving the user selection for the second program.

49. The method of claim 43, further comprising:
- detecting user navigation to select a new program based on the user input; and
- obtaining overhead information for at least one program in anticipation of user selection for one of the at least one program, the overhead information being used to decode the at least one program.

50. The method of claim 49, wherein the at least one program comprises a program for a program guide suitable for presentation on a display screen.

51. The method of claim 43, wherein the receiving the user input comprises receiving a key press to scroll through available programs.

52. The method of claim 43, wherein the receiving the user input comprises receiving a numeric input for a user selected program.

53. The method of claim 43, wherein the initiating the decoding of the at least one portion of the second program comprises initiating decoding of an audio portion of the second program prior to user selection of the second program.

54. The method of claim 43, wherein the initiating the decoding of the at least one portion of the second program comprises initiating decoding of a video portion of the second program prior to user selection of the first program.

55. The method of claim 43, further comprising:
- switching reception between the first and second programs after user selection of the second program.

56. A computer readable storage medium containing a set of instructions for a processor to perform a method of switching reception between multimedia programs in a wireless communication system, the medium comprising:
- instructions for decoding and decompressing at least one portion of a first program obtained from a first data frame;
- instructions for receiving user selection for a second program, the second program being different from the first program;
- instructions for obtaining from the first data frame overhead information associated with decoding the second program from a second data frame, wherein the overhead information includes at least time-frequency location of the second program within the second data frame;
- instructions for continuing the decoding of the at least one portion of the first program after receiving the user selection for the second program at least until the overhead information for the second program is obtained; and
- instructions for decoding at least one portion of the second program after obtaining the overhead information for the second program.

57. The medium of claim 56, further comprising:
- instructions for decompressing the at least one portion of the first program until the overhead information for the second program is obtained.

58. The medium of claim 57, wherein decompressing the at least one portion of the first program comprises video decoding a video portion of the first program.

59. The medium of claim 57, wherein decompressing the at least one portion of the first program comprises audio decoding an audio portion of the first program.

60. The medium of claim 56, further comprising instructions for decompressing the at least one portion of the first program until the at least one portion of the second program is decoded.

61. The medium of claim 56, further comprising instructions for decompressing the at least one portion of the second program after the second program has been decoded.

62. The medium of claim 56, further comprising instructions for switching reception between the first and second programs after decoding at least one portion of the second program.

63. An apparatus for switching reception between multimedia programs in a wireless communication system, the apparatus comprising:
   means for decoding and decompressing at least one portion of a first program obtained from a first data frame;
   means for receiving a user input;
   means for identifying a second program with potential for user selection based on the user input, the second program being different from the first program; and
   means for obtaining from the first data frame overhead information associated with decoding the second program from a second data frame, wherein the overhead information includes at least time-frequency location of the second program within the second data frame;
   means for initiating decoding of at least one portion of the second program from the second data frame prior to user selection of the second program while continuing to decompress the at least one portion of the first program.

64. The apparatus of claim 63, wherein the means for receiving the user input comprises means for receiving the user input highlighting the program.

65. The apparatus of claim 63, further comprising:
   means for decompressing the at least one portion of the second program after completing the decoding of the at least one portion of the second program.

66. The apparatus of claim 63, further comprising:
   means for switching reception between the first and second programs after user selection of the second program.

67. A method of switching reception between receiving multimedia programs in a wireless communication system, the method comprising:
   using a first decoder a first base stream for a first program obtained from a first data frame, the first base stream carrying base information for the first program;
   decoding using a second decoder a first enhancement stream for the first program obtained from the first data frame, the first enhancement stream carrying additional information for the first program;
   receiving user selection for a second program, the second program being different from the first program;
   obtaining from the first data frame overhead information associated with decoding the second program; and
   continuing decoding the first base stream for the first program using the first decoder and simultaneously beginning decoding using the second decoder a second base stream for the second program obtained from a second data frame.

68. The method of claim 67, wherein the overhead information includes at least time-frequency location of the second base stream of the second program within the second data frame.

69. The method of claim 67, further comprising:
   displaying the at least one portion of the first program until the at least one portion of the second program is decoded.

70. The method of claim 67, further comprising:
   switching reception between the first and second programs after decoding at least one portion of the second program.

71. The method of claim 70, wherein after switching reception between the first and second programs, the method further comprises:
   decoding the second base stream for the second program using the first decoder; and
   decoding a second enhancement stream for the second program using the second decoder.

72. A device for switching reception between multimedia programs in a wireless communication system, the device comprising:
   a communication component comprising a first decoder and a second decoder; and
   a processor coupled to the communication component, the processor configured to:
      direct the first decoder to decode a first base stream for a first program obtained from a first data frame, the first base stream carrying base information for the first program; and
      direct the second decoder to decode a first enhancement stream for the first program obtained from a first data frame, the first enhancement stream carrying additional information for the first program;
      direct the communication component to obtain from the first data frame an overhead information for decoding a second program; and
      direct the first decoder to continue decoding the first base stream for the first program and direct the second decoder to simultaneously begin decoding a second base stream for the second program obtained from a second data frame.

73. The device of claim 72, wherein the overhead information includes at least time-frequency location of the second base stream of the second program within the second data frame.

74. The device of claim 72, further comprising:
   a display for displaying the at least one portion of the first program until the at least one portion of the second program is decoded.

75. The device of claim 72, wherein the processor is further configured to switch reception between the first and second programs after decoding at least one portion of the second program.

76. The device of claim 75, wherein after switching reception between the first and second programs, the processor further configured to:
   direct the first decoder to decode the second base stream for the second program; and
   direct the second decoder to decode a second enhancement stream for the second program.

77. The medium of claim 60, further comprising:
   instructions for displaying the at least one portion of the first program while the overhead information for the second program is being obtained and until the at least one portion of the second program is decoded.

78. The medium of claim 56, further comprising:
   instructions for providing an indication that the second program is being decoded after receiving the user selection for the second program.

79. A method of switching reception between multimedia programs in a wireless communication system, the method comprising:
   decoding at least one portion of a first program obtained from a first data frame;

receiving user selection for a second program, the second program being different from the first program;

obtaining from the first data frame overhead information associated with decoding the second program from a second data frame, wherein the overhead information includes at least time-frequency location of the second program within the second data frame.

80. A device for switching reception between multimedia programs in a wireless communication system, the device comprising:

a communication component comprising a first decoder and a second decoder; and a processor coupled to the communication component, the processor configured to:

direct the first decoder to decode a first base stream for a first program obtained from a first data frame, the first base stream carrying base information for the first program; and direct the second decoder to decode a first enhancement stream for the first program obtained from a first data frame, the first enhancement stream carrying additional information for the first program;

direct the communication component to obtain from the first data frame an overhead information for decoding a second program.

* * * * *